(12) United States Patent
Cuzner et al.

(10) Patent No.: US 11,394,290 B2
(45) Date of Patent: Jul. 19, 2022

(54) HARMONIC REGULATOR FOR CURRENT SOURCE RECTIFICATION AND INVERSION

(71) Applicant: DRS Naval Power Systems, Inc., Milwaukee, WI (US)

(72) Inventors: Robert M. Cuzner, Waukesha, WI (US); Ashish R. Bendre, Shorewood, WI (US); William R. Kranz, Fox Point, WI (US)

(73) Assignee: DRS Naval Power Systems, Inc., Milwaukee, WI (US)

( * ) Notice: Subject to any disclaimer, the term of this patent is extended or adjusted under 35 U.S.C. 154(b) by 0 days.

(21) Appl. No.: 17/225,762

(22) Filed: Apr. 8, 2021

(65) Prior Publication Data

US 2021/0257900 A1     Aug. 19, 2021

Related U.S. Application Data

(63) Continuation of application No. 16/827,074, filed on Mar. 23, 2020, now Pat. No. 11,011,973, which is a
(Continued)

(51) Int. Cl.
*H02M 1/12*         (2006.01)
*H02M 5/458*      (2006.01)
(Continued)

(52) U.S. Cl.
CPC ........... *H02M 1/12* (2013.01); *H02M 5/4585* (2013.01); *H02M 7/217* (2013.01); *H02P 29/50* (2016.02)

(58) Field of Classification Search
CPC ...... H02M 1/12; H02M 5/4585; H02M 7/217; H02P 29/50; H02P 27/06
See application file for complete search history.

(56) References Cited

U.S. PATENT DOCUMENTS 4,620,272 A * 10/1986 Fulton ..................... H02P 23/06
                                                             363/126
6,839,249 B2 * 1/2005 Kalman .............. H02M 5/4585
                                                             363/39
(Continued)

OTHER PUBLICATIONS

U.S. Appl. No. 13/900,321, Non-Final Office Action, dated Jun. 19, 2015, 10 pages.
(Continued)

*Primary Examiner* — Jue Zhang
(74) *Attorney, Agent, or Firm* — Kilpatrick Townsend & Stockton LLP

(57) ABSTRACT

A methods and systems for generating rectified signals are disclosed. For example, a system performing the methods includes a current source rectifier which has a plurality of switches configured to receive an input current from an AC voltage source and to receive a plurality of control signals. The switches are configured to produce a rectified output current based on the input current and the control signals. The system also includes a rectifier controller configured to receive a current sense signal indicative of the rectified output current and to generate the control signals based at least in part on the current sense signal, where the control signals cause the current source rectifier to attenuate at least one of a plurality of harmonic frequencies in the rectified output current.

21 Claims, 13 Drawing Sheets

Related U.S. Application Data continuation of application No. 16/029,479, filed on Jul. 6, 2018, now Pat. No. 10,630,162, which is a continuation of application No. 14/934,036, filed on Nov. 5, 2015, now Pat. No. 10,056,820, which is a continuation of application No. 13/900,321, filed on May 22, 2013, now Pat. No. 9,240,732.

(60) Provisional application No. 61/650,469, filed on May 22, 2012.

(51) Int. Cl.
*H02M 7/217* (2006.01)
*H02P 29/50* (2016.01)

(56) References Cited

U.S. PATENT DOCUMENTS

| | | | | |
|---|---|---|---|---|
| 9,240,732 | B2* | 1/2016 | Cuzner | H02M 5/4585 |
| 10,056,820 | B2* | 8/2018 | Cuzner | H02M 1/12 |
| 10,630,162 | B2 | 4/2020 | Cuzner et al. | |
| 2007/0216343 | A1* | 9/2007 | Rozman | H02M 1/12 |
| | | | | 318/811 |
| 2010/0014326 | A1 | 1/2010 | Gu et al. | |
| 2013/0314953 | A1 | 11/2013 | Cuzner et al. | |
| 2016/0126824 | A1 | 5/2016 | Cuzner et al. | |

OTHER PUBLICATIONS

U.S. Appl. No. 13/900,321 , Notice of Allowance, dated Sep. 14, 2015, 9 pages.
U.S. Appl. No. 14/934,036 , Advisory Action, dated Aug. 15, 2017, 3 pages.
U.S. Appl. No. 14/934,036 , Final Office Action, dated Jun. 8, 2017, pp. 14.
U.S. Appl. No. 14/934,036 , Non-Final Office Action, dated Oct. 3, 2017, 11 pages.
U.S. Appl. No. 14/934,036 , Non-Final Office Action, dated Dec. 29, 2016, 12 pages.
U.S. Appl. No. 14/934,036 , Notice of Allowance, dated Apr. 9, 2018, 8 pages.
U.S. Appl. No. 16/029,479 , Final Office Action, dated Sep. 3, 2019, 7 pages.
U.S. Appl. No. 16/029,479 , Non-Final Office Action, dated Jun. 24, 2019, 14 pages.
U.S. Appl. No. 16/029,479 , Notice of Allowance, dated Dec. 11, 2019, 8 pages.
U.S. Appl. No. 16/827,074 , Non-Final Office Action, dated Sep. 17, 2020, 7 pages.
U.S. Appl. No. 16/827,074 , Notice of Allowance, dated Jan. 22, 2021, 9 pages.

\* cited by examiner

HARMONIC REGULATOR FOR CURRENT SOURCE RECTIFICATION AND INVERSION

CROSS-REFERENCES TO RELATED APPLICATIONS

This application is a continuation of U.S. application Ser. No. 16/827,074, titled "HARMONIC REGULATOR FOR CURRENT SOURCE RECTIFICATION AND INVERSION," filed Mar. 23, 2020, which is a continuation of U.S. application Ser. No. 16/029,479, titled "HARMONIC REGULATOR FOR CURRENT SOURCE RECTIFICATION AND INVERSION," filed Jul. 6, 2018, which is a continuation of U.S. application Ser. No. 14/934,036, titled "HARMONIC REGULATOR FOR CURRENT SOURCE RECTIFICATION AND INVERSION," filed Nov. 5, 2015, which is a continuation of U.S. application Ser. No. 13/900,321, titled HARMONIC REGULATOR FOR CURRENT SOURCE RECTIFICATION AND INVERSION," filed May 22, 2013, which claims the benefit of U.S. Provisional Patent Application No. 61/650,469, titled "HARMONIC REGULATOR FOR CURRENT SOURCE RECTIFICATION AND INVERSION," filed May 22, 2012, which are hereby incorporated in their entirety and for all purposes.

FIELD OF THE INVENTION

The disclosure herein relates generally to three-phase voltage rectifiers, and more particularly to three-phase voltage rectifiers with low harmonic load presented to the driving power supply.

BACKGROUND OF THE INVENTION

AC to DC converters are frequently used to provide power from an AC power supply to one or more devices which require DC power. In some applications, AC to DC converters are used to provide DC power to a DC to AC converter. In such applications, the AC to DC converter and the DC to AC converter collectively form an AC to AC inverter. FIG. 1 illustrates a system 100 including an AC to DC converter 120 providing power from AC service 115 to an AC motor 180 via the DC to AC converter 130.

In some cases, the AC service 115 can have power quality requirements, such as those specified by Mil-Std-1399 Sec. 300B, or other power quality standards. In such cases, harmonics generated by the AC to DC converter 120 should be minimized, as they may cause the voltage of the AC service 115 to deviate from a pure sinusoid. These deviations may cause poor performance in other devices connected to the AC service 115. In addition, these deviations may cause the AC service 115 to fail the power quality requirements.

AC to DC Converters may utilize pulse-width modulated current source rectifiers, such as that shown in FIG. 2, as opposed to passive rectifiers, thyristor-based phase controlled rectifiers and voltage source rectifiers. The current source rectifier is an attractive alternative to these other types of rectifiers more widely used by industry because it can achieve AC-to-DC voltage conversion with nearly sinusoidal input currents with less input filter components, no in-rush limiting circuitry and no step-down transformer in cases where the desired output voltage is lower than the input. All of this results in smaller size and lower parts count.

The current source rectifier 110 shown in FIG. 2 is an active AC-to-DC rectifier that converts three-phase AC input power to a controlled DC voltage through an active rectification process and drives a constant power load 104. In the illustration, the three-phase AC input power is shown coming off of an AC power grid 102 and is provided to the current source rectifier 110 through input lines a, b, and c. The controller 101 receives the input voltages via signal drivers 106 and 108. The controller 101 also receives output voltage $v_o$ as well as the DC link current $i_p$ through the inductor $L_P$ from the current source rectifier 110. Controller 101 then provides control signals $U_{i1}$-$U_{i6}$ to control the switches $S_{i1}$-$S_{i6}$ of the current source rectifier 110, respectively.

SUMMARY OF THE INVENTION

Figure 1:
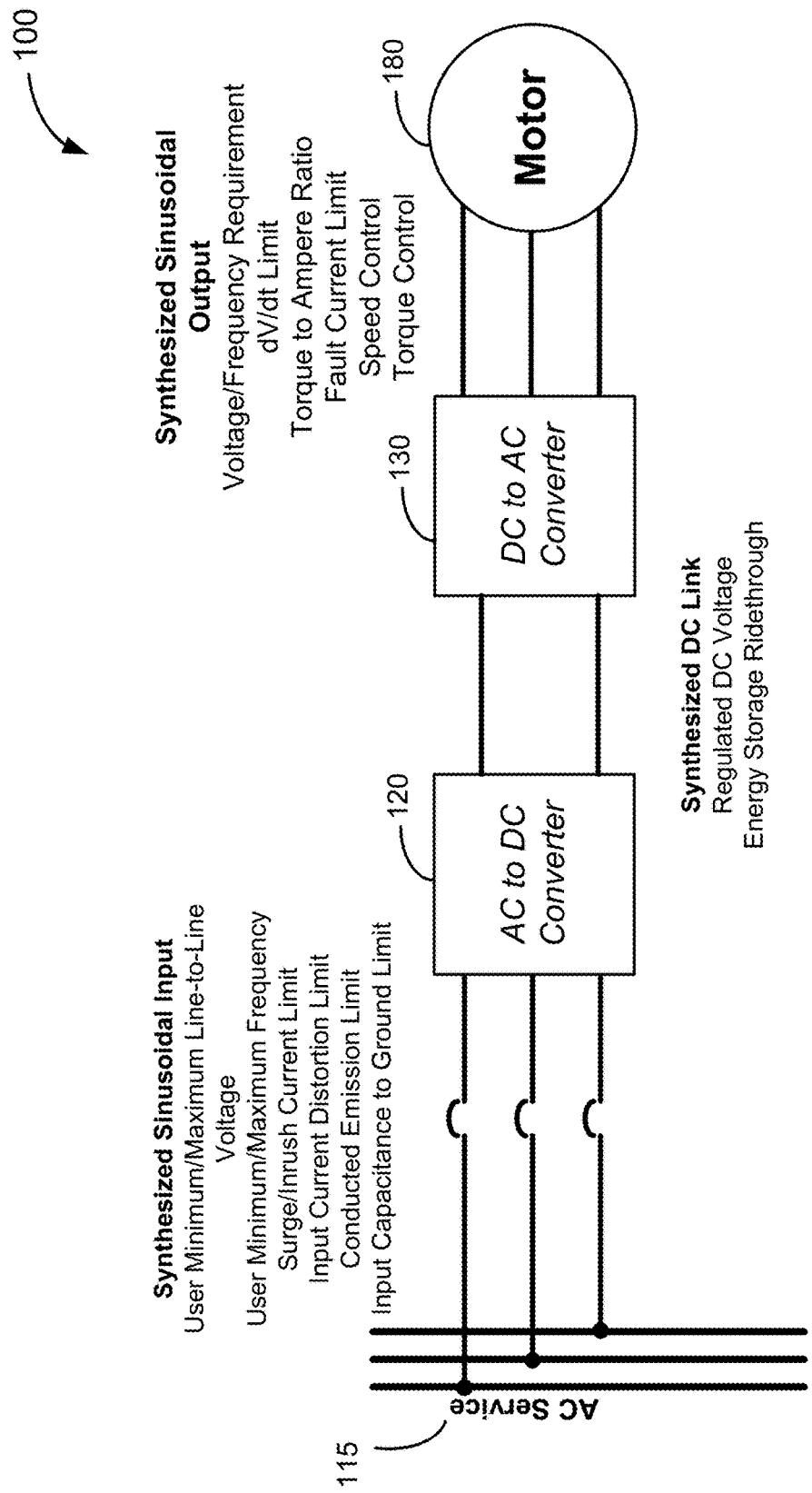
FIG. 1 is a simplified block diagram of a system providing power to a motor.

One inventive aspect is a system, which includes a current source rectifier having a plurality of switches configured to receive an input current from an alternating current (AC) voltage source and to receive a plurality of control signals. The switches are configured to produce a rectified output current based on the input current and the control signals. The system also includes a rectifier controller configured to receive a current sense signal indicative of the rectified output current and to generate the control signals based at least in part on the current sense signal, where the control signals cause the current source rectifier to attenuate at least one of a plurality of harmonic frequencies in the rectified output current.

Another inventive aspect is a rectifier control circuit, configured to control a current source rectifier configured to generate a rectified output current. The rectifier control circuit is further configured to receive a current sense signal indicative of the rectified output current and to generate a plurality of control signals based at least in part on the current sense signal, where the control signals cause the current source rectifier to attenuate at least one of a plurality of harmonic frequencies in the rectified output current. The rectifier control circuit includes a DC offset circuit configured to remove a DC component from the current sense signal to generate an AC sense signal, a harmonic angle generator configured to generate a plurality of harmonic frequency signals, and one or more harmonic regulator circuits, each configured to receive the AC sense signal and one of the harmonic frequency signals, and to generate a harmonic compensation signal based on the received harmonic frequency signal and the AC sense signal. The rectifier control circuit also includes a combiner configured to generate a feedback signal based on the harmonic compensation signals of the harmonic regulator circuits, and a power switch state selection circuit configured to receive the feedback signal and to generate the control signals based on the feedback signal.

Another inventive aspect is a variable speed drive, including a current source rectifier having a plurality of switches configured to receive an input current from an alternating current (AC) voltage source and to receive a plurality of control signals, where the switches are configured to produce a rectified output current based on the input current and the control signals. The variable speed drive also includes a rectifier controller configured to receive a current sense signal indicative of the rectified output current and to generate the control signals based at least in part on the current sense signal, where the control signals cause the current source rectifier to attenuate at least one of a plurality of harmonic frequencies in the rectified output current. The variable speed drive also includes an inverter configured to receive the rectified output voltage and to generate and AC voltage output based on the rectified output voltage.

DETAILED DESCRIPTION OF SPECIFIC EMBODIMENTS

Typically, current source converters do not exhibit many of the undesirable side-effects of power conversion that can be found in voltage source converters (used in many variable speed drives and power converters) because they do not impose voltage pulses on the source or load. As such, current source converters do not typically require large input filter inductors and capacitors that may be necessary for voltage source converters (VSC) to reduce electro-magnetic interference (EMI) or transmission line effects caused by high voltage changes with respect to time (dV/dt). Current source converters may also present nearly sinusoidal voltages to the system, so that filter size requirements for meeting low input current harmonic distortion can be less burdensome than those for voltage source converters.

The Harmonic Regulation System described herein enables the implementation of a control that targets specific harmonics. By reducing the magnitude of these harmonics, the magnitude of the harmonic content presented to the power distribution system at the input of the converter can be maintained below system limits. In addition, headroom can be allocated to allow for higher ripple current in the DC link inductor.

The harmonic regulation system discussed below can achieve the same performance as a very high sample rate system but with more reasonable control update execution rates for the calculation of $U_{i1}$-$U_{i6}$ to control the switches $S_{i1}$-$S_{i6}$ of the current source rectifier for microprocessor or digital signal processor controlled systems. Therefore, the harmonic regulation system discussed below enables the use of low cost processing hardware.

Certain embodiments of the invention provide for control of harmonic currents at the inputs of a variable speed drive through control of a single quantity representing DC Link Current. This may require less sensing hardware than other conventional techniques that monitor the three-phase input voltages and currents and use the monitored parameters to reduce harmonics or to implement an active damping approach. The result can be significantly lower cost and greater simplicity.

In some embodiments, it is also possible to enable harmonic regulators to remove voltage harmonics that would otherwise be imposed upon the power distribution system.

Figure 3:
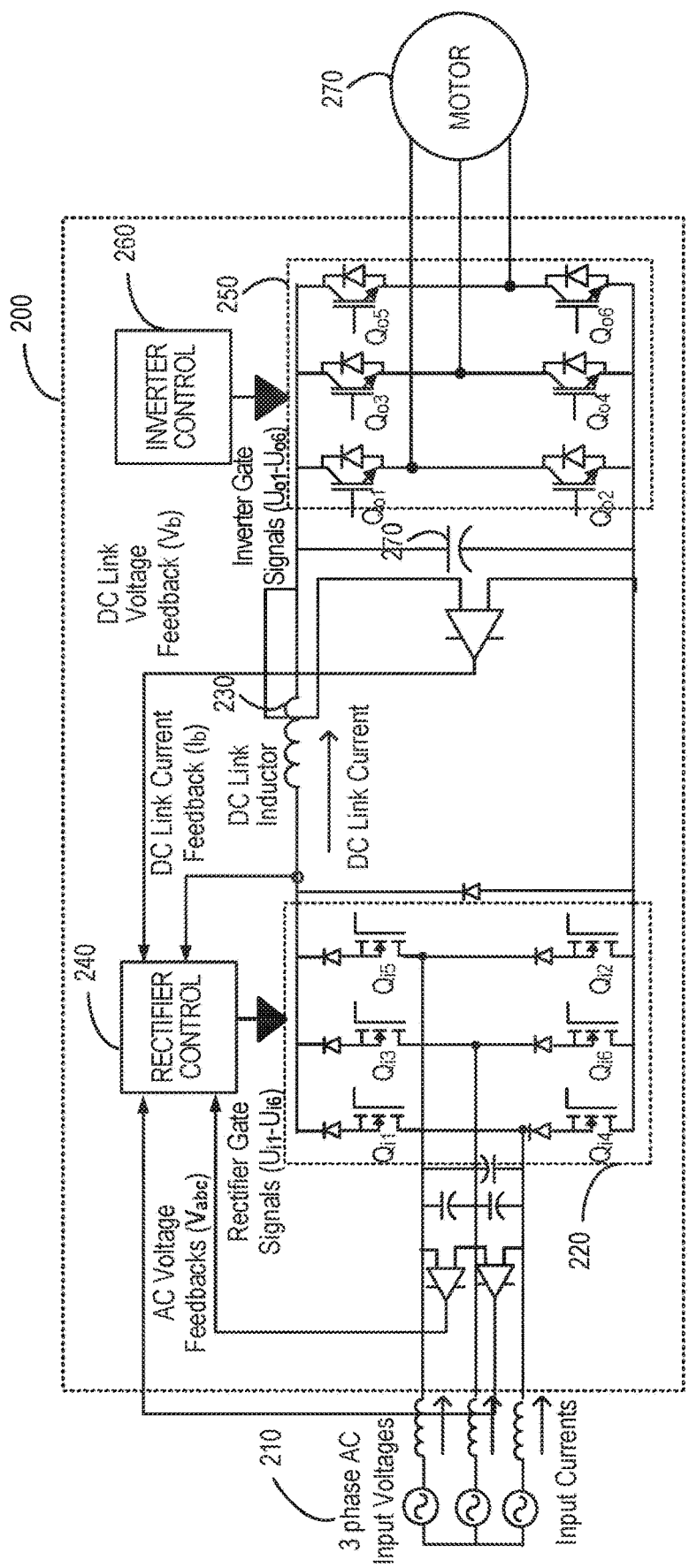
FIG. 3 is a simplified block diagram of a driver having a current source rectifier with a rectifier control circuit, according to an embodiment of the present invention.

FIG. 3 illustrates a variable speed drive 200, according to an embodiment of the invention. The variable speed drive 200 may, for example, be used in the system 100. The variable speed drive 200 is connected to a three-phase voltage source 210, and is configured to provide power from the voltage source 210 to a motor 270. Variable speed drive 200 includes power switches 220, a DC link component, inductor 230, a rectifier controller 240, a voltage inverter 250, and inverter controller 260. Embodiments of the invention provide for the implementation of a power efficient current source rectifier, having a physically smaller DC link inductor, using low cost, practically implementable control hardware.

The voltage source can be a 60 Hz three-phase alternating current (AC) source, or the like. The power switches 220 may, for example, be insulated gate bipolar transistors (IGBTs), Metal Oxide Field Effect Transistors (MOSFETS), or the like. Some embodiments include additional filtering means to help reduce harmonic currents. For example, additional capacitors, resistors, or combinations thereof, can be additionally used to filter unwanted frequencies.

Three-phase voltage source 210 provides current to the power switches 220 on three input lines. Each of the input lines provides one phase of current to a pair of power switches 220. The power switches 220, as part of a current source rectifier, provide current to the motor 270 through DC link inductor 230 and voltage inverter 250.

The voltage inverter 250 receives a substantially DC voltage through the filtering action of the DC link inductor 230 and the DC link capacitor 270. The motor receives a three-phase voltage having a frequency based on the operation of the voltage inverter 250, which is configured to selectively turn on and off the switches of the voltage inverter 250. The switches of the voltage inverter 250 are turned on and off with signals from the inverter controller 260 which are determined according to a pulse width modulation scheme. The timing and duration of the signals are selected to provide a substantially sinusoidal three-phase voltage to motor 270. As shown in FIG. 3, voltage inverter 250 is a voltage source inverter. In other embodiments, a current source inverter may alternatively be used.

The operation of the power switches 220 is controlled by the rectifier controller 240. Using a pulse width modulation scheme, the rectifier controller 240 provides signals to the power switches 220 to selectively turn on and off the power switches 220 according to the phases of the three input voltages. The timing and duration of the signals are selected to provide a rectified current to DC link inductor 230 and a rectified DC voltage to the voltage inverter 250.

In this embodiment, the rectifier controller 240 receives a signal (Vb) representing the voltage at the voltage inverter 250. As discussed further below, the rectifier controller is configured to control the timing and duration of the signals controlling the power switches based, at least in part, on the signal representing the signal Vb. For example, the rectifier controller 240 is at least configured to control the timing induration signals such that Vb is substantially fixed and is approximately equal to a reference voltage.

The rectifier controller 240 also receives a signal (Ib) representing the current of the DC link inductor 230. Other signals may be used in other embodiments such as the AC voltage feedbacks Vabc which are fed into a harmonic angle generator in order to lock the timing of the selection of gate signals to the fundamental frequency of the periodic change in the input voltages.

As discussed further below, the rectifier controller 240 is configured to control the timing and duration of the signals controlling the power switches based, at least in part, on the AC voltage signals and the signal Ib. For example, the rectifier controller 240 is at least configured to control the timing and duration of the signals such that certain harmonics in the current of the DC link inductor 230 are attenuated.

Figure 9:
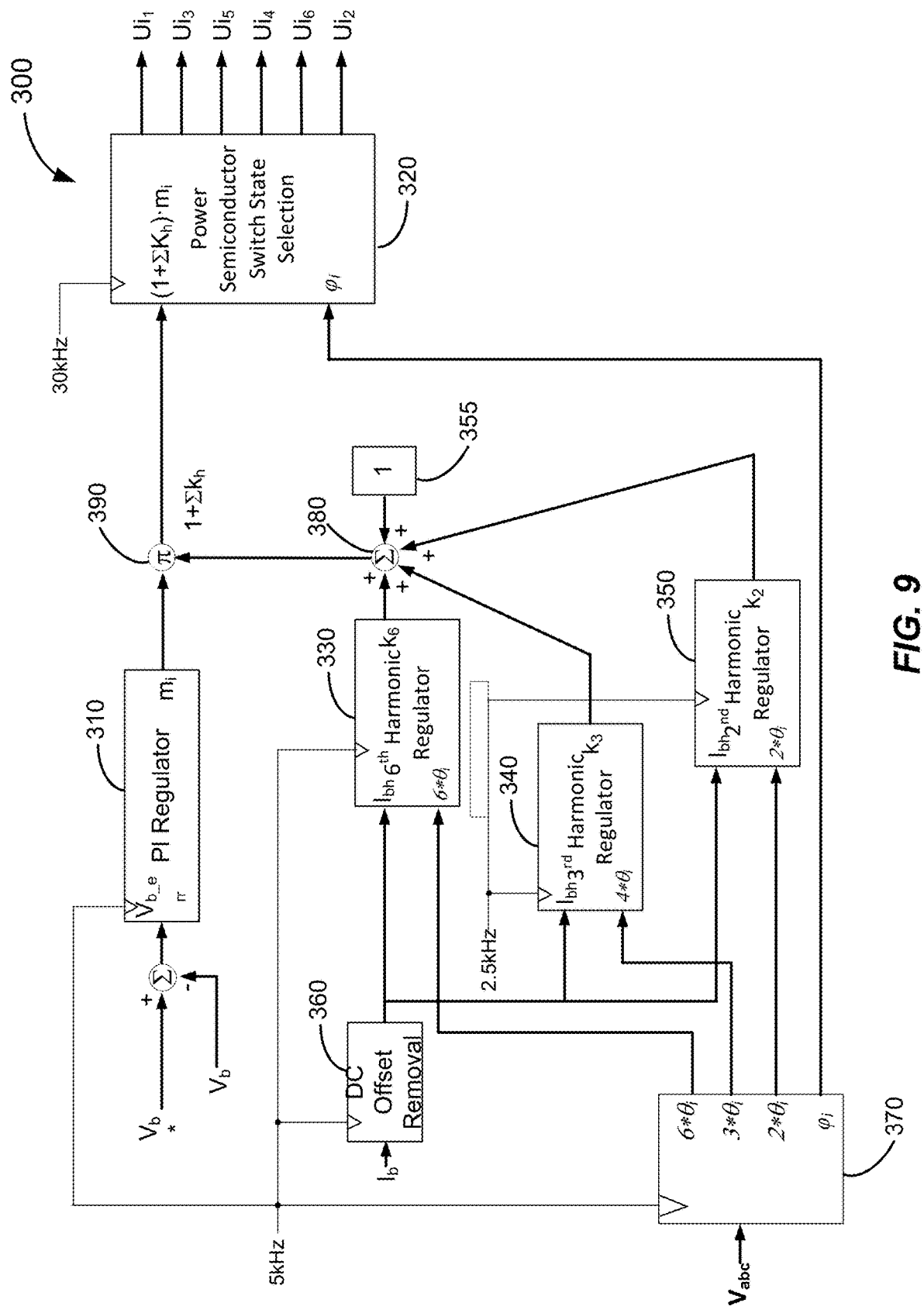
FIG. 9 is a simplified block diagram of a rectifier control circuit for a current source rectifier, according to an embodiment of the present invention.
Figure 10:
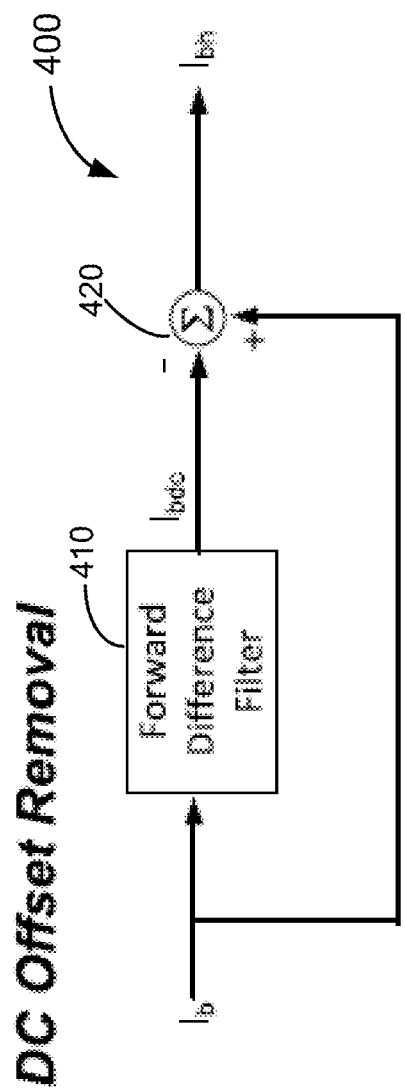
FIG. 10 is a simplified block diagram of a DC offset removal circuit for a harmonic regulator, according to an embodiment of the present invention.
Figure 11:
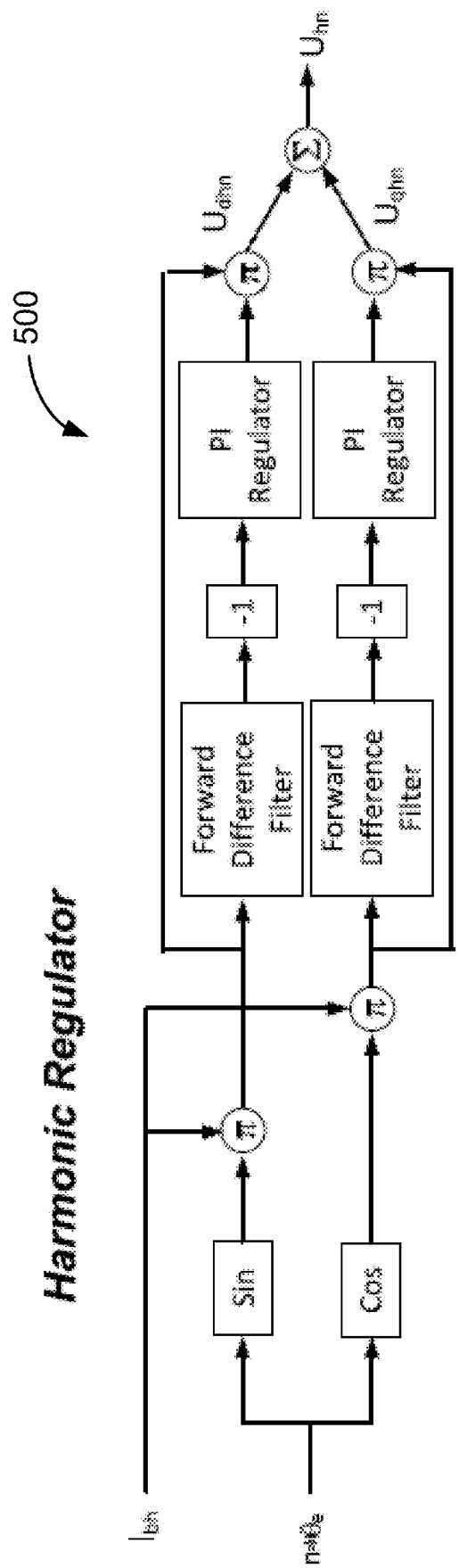
FIG. 11 is a simplified block diagram of a harmonic regulator, according to an embodiment of the present invention.

FIGS. 4-8 illustrate examples of aspects of the functionality of the rectifier controller 240 and the power switches 220, which operate with the DC link inductor 230 and the DC link capacitor 270 to generate a substantially DC voltage. The functionality of the rectifier controller 240 may alternatively operate according to different aspects and principles. FIGS. 9-11 illustrate examples of aspects of the rectifier controller 240 and the power switches 220, which work with DC link inductor 230 and the DC link capacitor 270 to attenuate harmonics in the current of the DC link inductor 230. The functionality of the rectifier controller 240 may alternatively operate according to different aspects and principles.

Figure 4:
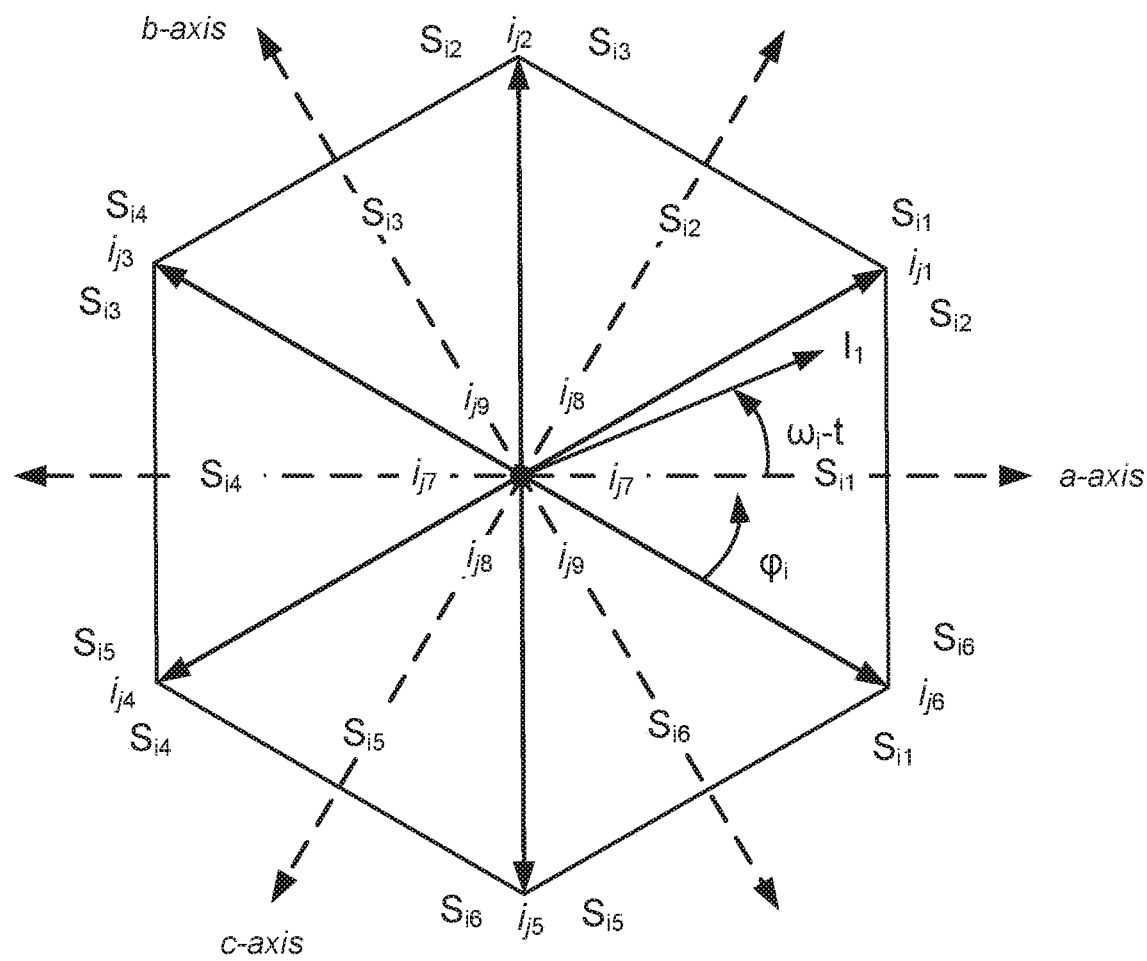
FIG. 4 is a phasor diagram for use with certain embodiments.

FIG. 4 illustrates a phasor diagram which divides the electrical cycle of the periodically changing incoming three-phase voltages and currents $\theta_i$ into six equal 60 degree sectors. As can be seen, the current source rectifier switch states have been superimposed on the abc phase plane of the phasor diagram. Three (or four) active switches of the current source rectifier and the two applied line-to-line voltages or three applied line-to-neutral voltages change every 60 degree sector. $S_k$ and $S_n$ denote the two PWM-controlled switches, $S_q$ denotes the switch that is held on, and $S_z$ denotes the switch for the zero state (if used). One embodiment of the current source rectifier control, synthesizes sinusoidal three-phase input currents and controls DC output voltage by controlling the amount of time PWM-controlled switches $S_k$ and $S_n$ are turned on over a switching frequency period according to equations 1-3 below, where the duty cycles are given by equations 4-6.

$$T_k = d_k(\varphi_i) \cdot T_{si} \quad\quad 1$$

$$T_n = d_n(\varphi_i) \cdot T_{si} \quad\quad 2$$

$$T_o = [1 - d_k(\varphi_i) - d_n(\varphi_i)] \cdot T_{si} \quad\quad 3$$

where $$d_k(\varphi_i) = U_{eq} \cdot \sin\left(\frac{\pi}{3} - \varphi_i\right) \quad\quad 4$$

$$d_n(\varphi_i) = U_{eq} \cdot \sin(\varphi_i) \quad\quad 5$$

$$T_{si} = \frac{1}{f_{si}} \quad\quad 6$$

The angle $\varphi_i$ is related to $\theta_i$ by the following relationship:

$$\varphi_i(t) = \theta_i + \frac{\pi}{6} \quad\quad 7$$

Where $\theta_i$ is produced by the harmonic angle generator and $\varphi_i$ resets to zero at $$\theta_i = \frac{\pi}{6}, \frac{\pi}{2}, \frac{5 \cdot \pi}{6}, \frac{7 \cdot \pi}{6}, \frac{3 \cdot \pi}{2}, \frac{11 \cdot \pi}{6} \quad\quad 8$$

and each of the above values of $\theta_i$ represents entry into a subsequent 60 degree sector and exit from a previous 60 degree sector.

One way to generate the gate control signals $U_{i1}$-$U_{i6}$ is to compare the duty cycles of equations 4 and 5 to symmetrical triangle waves that vary with the switching frequency $f_{si}$ and are 180 degrees out of phase with each other in order to produce the gating signals for the PWM-controlled switches $S_k$ and $S_n$. Table 1 below shows how the switches of FIG. 3 are assigned in each sector. Those switch states that are generated through comparison with 180 degree phase-shifted triangles are designated by the shaded cells with * marks under the $S_k$ and $S_n$ headings for each sector.

TABLE 1

Pole voltages and currents in each sector

| Electrical Angle ($\square_i$) | Sector | Sector Switches | | PWM Controlled Switches | | Pole Voltages | | | | Pole Currents | |
|---|---|---|---|---|---|---|---|---|---|---|---|
| | | $S_q$ | $S_z$ | $S_k$ | $S_n$ | $v_k$ | $v_n$ | $v_{k0}$ | $v_{n0}$ | $i_k$ | $i_n$ |
| 330° | 1 | $S_{i1}$ | $S_{i4}$ | *$S_{i6}$ | $S_{i2}$ | $v_{ab}$ | $-v_{ca}$ | $-v_b$ | $-v_c$ | $-i_b$ | $-i_c$ |
| 30° | 2 | $S_{i2}$ | $S_{i5}$ | $S_{i1}$ | *$S_{i3}$ | $-v_{ca}$ | $v_{bc}$ | $v_a$ | $v_b$ | $i_a$ | $i_b$ |
| 90° | 3 | $S_{i3}$ | $S_{i6}$ | *$S_{i2}$ | $S_{i4}$ | $v_{bc}$ | $-v_{ab}$ | $-v_c$ | $-v_a$ | $-i_c$ | $-i_a$ |
| 150° | 4 | $S_{i4}$ | $S_{i1}$ | $S_{i3}$ | *$S_{i5}$ | $-v_{ab}$ | $v_{ca}$ | $v_b$ | $v_c$ | $i_b$ | $i_c$ |
| 210° | 5 | $S_{i5}$ | $S_{i2}$ | *$S_{i4}$ | $S_{i6}$ | $v_{ca}$ | $-v_{bc}$ | $-v_a$ | $-vb$ | $-i_a$ | $-i_b$ |
| 270° | 6 | $S_{i6}$ | $S_{i3}$ | $S_{i5}$ | *$S_{i1}$ | $-v_{bc}$ | $v_{ab}$ | $v_c$ | $v_a$ | $i_c$ | $i_a$ |

As discussed above, a current source with a freewheeling diode does not require the switching of $S_z$ in order to create the zero state. Instead, the freewheeling diode automatically creates the zero state by providing a path through which DC link inductor current can flow when the devices are switched off.

Figure 5:
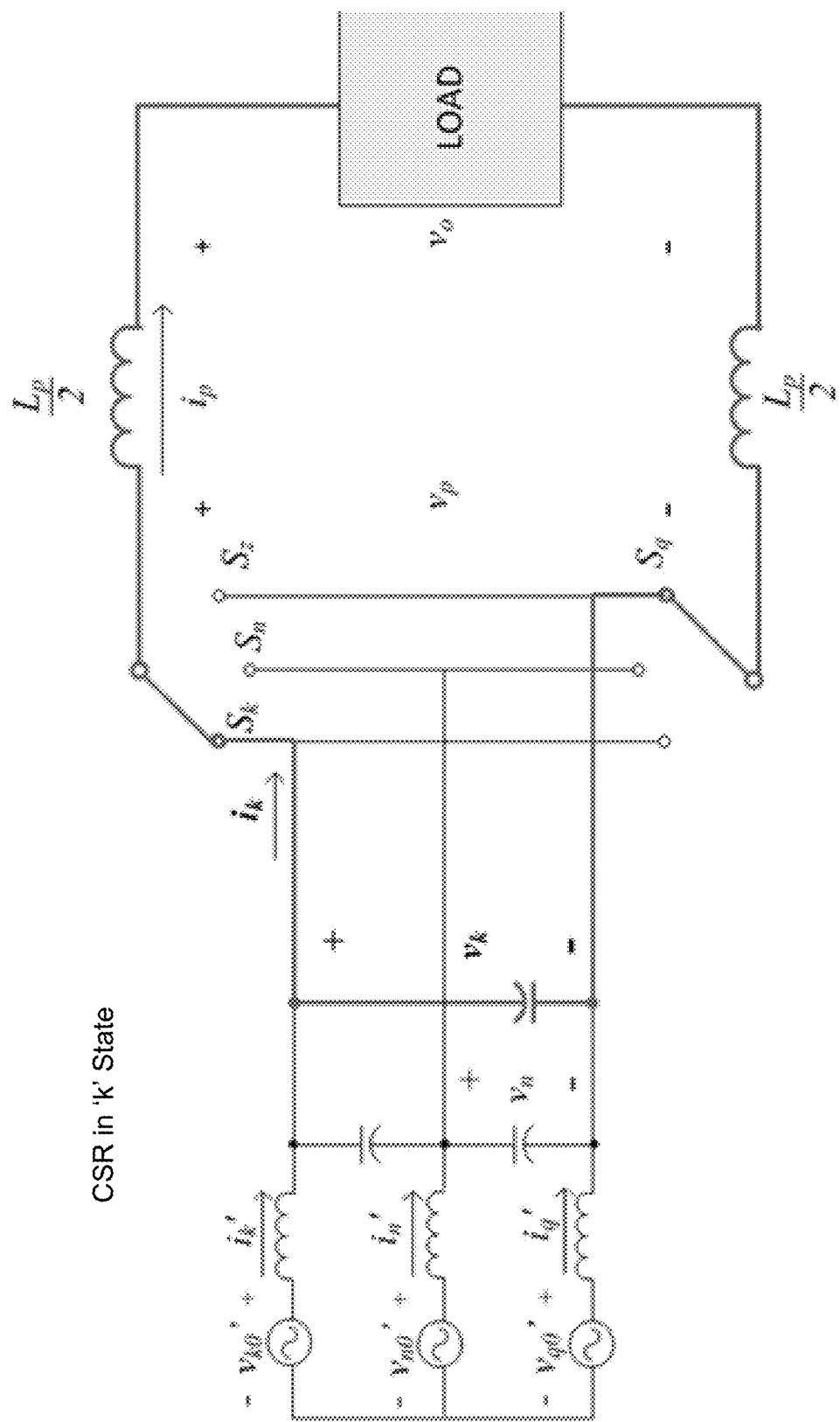
FIG. 5 is a simplified schematic diagram of an example of a current source rectifier in a first switch state according to one embodiment.
Figure 6:
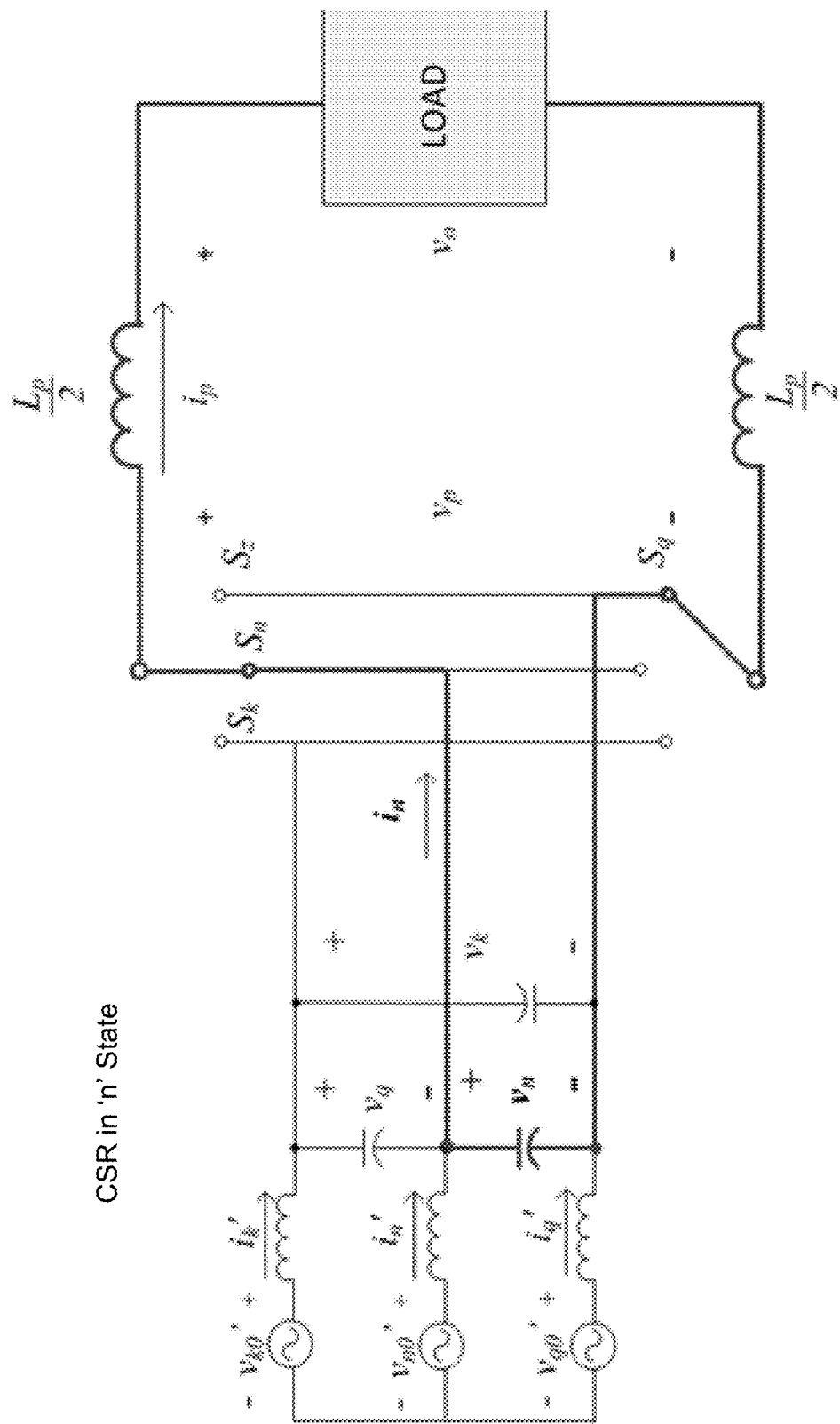
FIG. 6 is a simplified schematic diagram of an example of a current source rectifier in a second switch state according to one embodiment.
Figure 7:
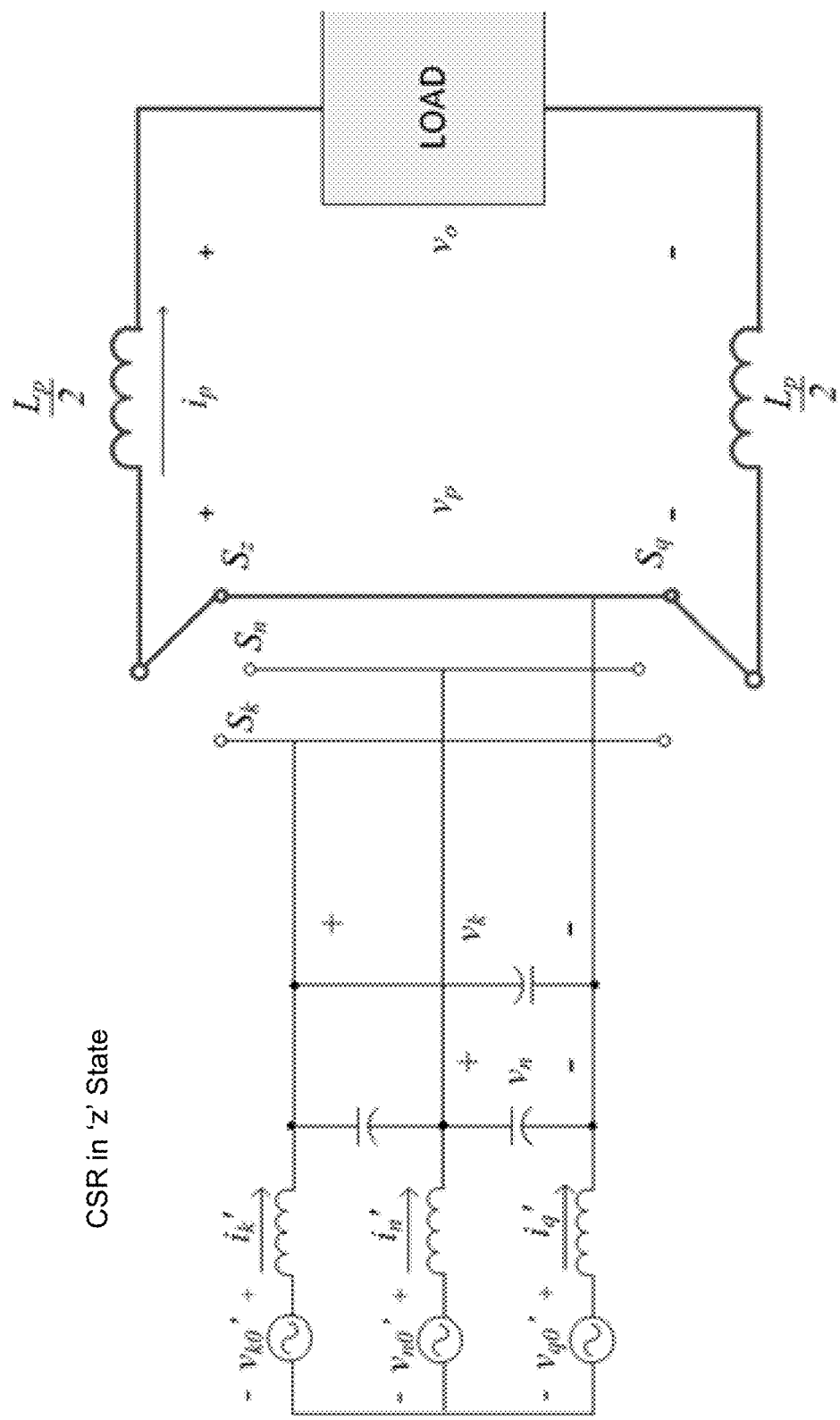
FIG. 7 is a simplified schematic diagram of an example of a current source rectifier in a third switch state according to one embodiment.
Figure 8:
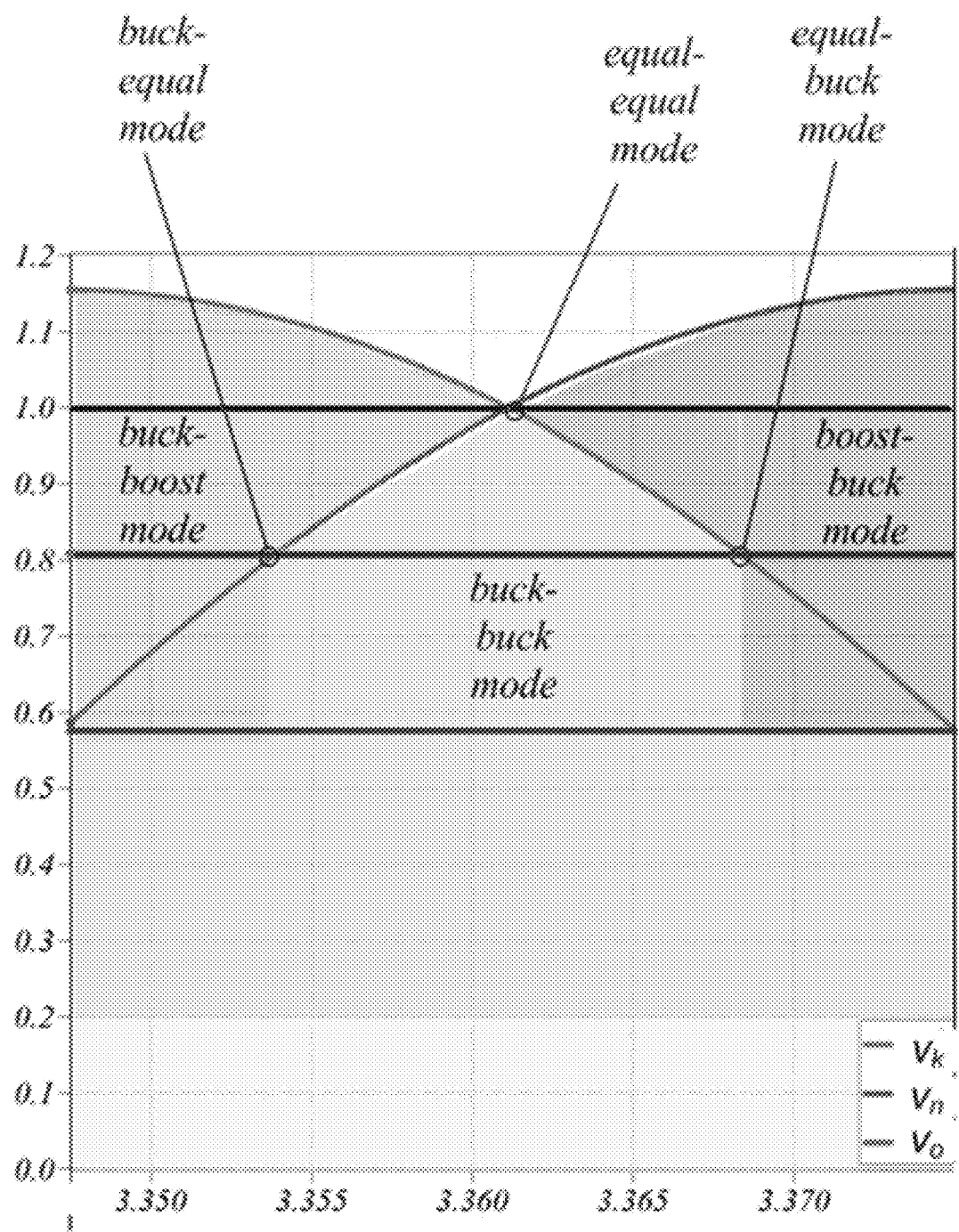
FIG. 8 is a simplified graph of input-to-output voltage ratios of a current source rectifier according to one embodiment.

PWM operation of the current source rectifier can be understood by restricting the analysis to a single 60° sector. FIGS. 5-7 show the current source rectifier circuit 110 of FIG. 3 during its three commutation stages for a single sector (Sector 2) with its two active switch states (FIGS. 5 and 6) and the zero or null state (FIG. 7). The zero state can also be produced with a freewheeling diode in which case the two active switches are in the off state. The two active switch states are named for the active switch, denoted as either the 'k' switch or the 'n' switch. The sector is named for the switch that is held on, the 'q' switch. The zero state is produced by switching on the 'z' switch. This 'k-n-q-z' convention is followed from this point forward in the discussion herein. The 'k-n-q-z' switches change every sector, as do the input pole voltages (the line-to-line voltage across the associated input capacitor) designated as $v_k$ and $v_n$ and the pole currents (the currents that flow through the active switch when it is on) designated as $v_k$ and $v_n$. Table 1 above shows the pole voltages and currents that are assigned to $v_k$, $v_n$, $i_k$ and $i_n$ for each sector.

FIGS. 5-7 depict example block diagrams of a current source rectifier operating in different switch states according to one embodiment. The assignment of the applied line-to-line voltages $v_k$ and $v_n$, input currents $i_k$ and $i_n$, and equivalent line-to-neutral voltages $v_{k0}$ and $v_{n0}$ for each sector is shown in Table 1 above. In a given sector, the current source rectifier PWM-controlled switches ($S_k$ and $S_n$) and full on switch ($S_q$) connect two AC input voltages to the DC link inductor $L_p$, and synthesize a DC voltage through PWM control that is lower than the peak line-to-line voltage of the two voltages.

FIG. 5 depicts an example of a current source rectifier in a first switch state according to one embodiment. In the illustrated embodiment, this active switch state is referred to as the 'k' switch state. In this state, the input voltage across the DC link inductor $L_p$ is $v_k$ and the current $i_k=i_p$ flows through $L_p$. In order to reach this state, switches $S_k$ (e.g., $S_{i1}$ from FIG. 3) and $S_q$ are turned on while the other switches in the current source rectifier remain turned off. FIG. 6 depicts an example of a current source rectifier in a second switch state according to one embodiment. In the illustrated embodiment, this active switch state is referred to as the 'n' switch state. In this state, the input voltage across the DC link inductor $L_p$ is $v_n$ and the current $i_n=i_p$ flows through $L_p$. In order to reach this state, switches $S_n$ (e.g., $S_{i3}$ from FIG. 3) and $S_q$ are turned on while the active switches in the current source rectifier remain turned off. FIG. 7 depicts an example of a current source rectifier in a third switch state according to one embodiment. In the illustrated embodiment, this switch state is referred to as the 'z' or 'zero' switch state. In this state, there is no input voltage applied across the DC link inductor $L_p$ and thus current $i_p$ flows to ground and dissipates in the load. In order to reach this state, switches $S_z$ (e.g., $S_{i5}$ from FIG. 3) and $S_q$ are turned on while the other active switches in the current source rectifier remain turned off.

Figure 2:
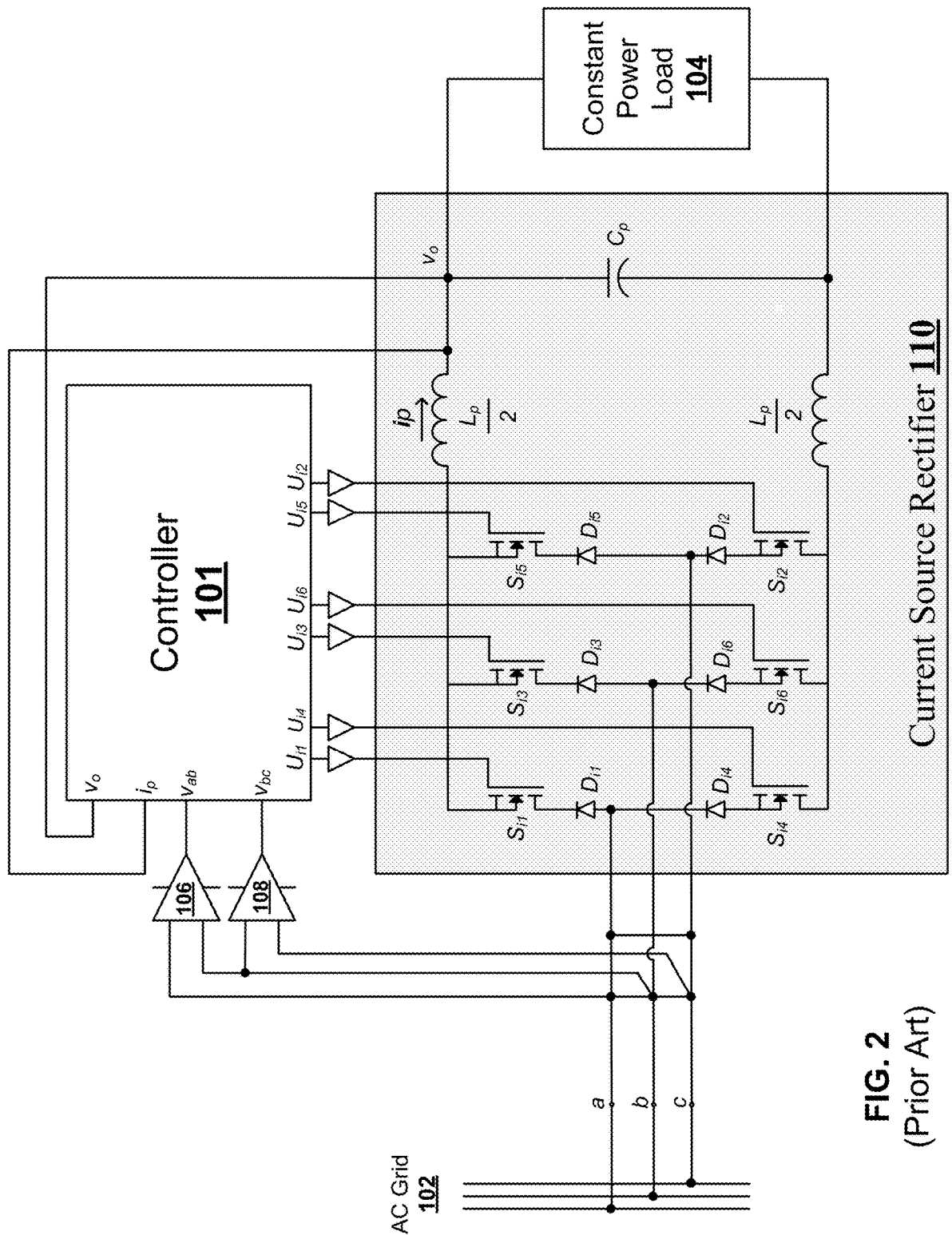
FIG. 2 is a simplified block diagram of a conventional controller and current source rectifier.

FIG. 9 illustrates a rectifier control circuit 300 according to an embodiment of the invention. The rectifier control circuit 300 can be used, for example, in the rectifier control circuit 240 of variable speed drive 200 of FIG. 2 to generate the signals discussed above with reference to FIGS. 4-8 such that certain harmonics in the current of the DC link inductor 230 are attenuated.

The rectifier control circuit 300 includes a phase locked loop (PLL) 370 as a harmonic angle generator, a DC offset removal block 360, a $2^{nd}$ harmonic regulator 350, a $3^{rd}$ harmonic regulator 340, a $6^{th}$ harmonic regulator 330, a power switch state selection circuit 320, and a proportional plus integral regulator (PI regulator) 310. The specific implementation for each of the phase locked loop (PLL) 370, the DC offset removal block 360, the harmonic regulators 330, 340, and 350, the power switch state selection circuit 320, and the PI regulator 310 is not limited. Some embodiments include more or fewer harmonic regulators and some embodiments regulate other harmonics (e.g., $1^{st}$, $4^{th}$, and $8^{th}$ harmonics).

In operation, the DC link current signal (Ib) is provided to the DC offset removal block configured to remove a DC component from the current sense signal to generate an AC sense signal representing the unwanted harmonic content in the DC link current. Accordingly, the output of the DC offset removal block 360 is the AC component of Ib, which is provided to each of the harmonic regulators 330, 340, and 350.

The harmonic regulators 330, 340, and 350 respectively generate a harmonic compensation signal based on the frequency component of the Ib signal matching the harmonic which each of the regulators 330, 340, and 350 are configured to respond to. The respective harmonic compensation signals are combined with a unity signal at summing circuit 380 to generate a harmonic compensation signal, which is used as discussed below.

PI regulator 310 receives a DC error voltage based on a difference between reference voltage Vb* and signal Vb representing the voltage at voltage inverter 250. Based on the error voltage, PI regulator 310 generates a difference signal Ud.

Multiplier 390 combines the difference signal Ud with the harmonic compensation signal to generate a feedback control signal. Because the difference signal Ud is based on the DC error voltage, and the harmonic compensation signal is based on the harmonics in the DC link current signal Ib to be attenuated, the feedback control signal is based on both the DC error voltage and the harmonics to be attenuated. The feedback control signal is provided to power switch state selection circuit 320.

The power switch state selection circuit 320 generates power switch state signals based on the feedback control signal to generate the signals for the power switches 220. Accordingly, the power switch state selection circuit 320 generates power switch state signals which result in a substantially DC voltage as discussed above with reference to FIGS. 4-8, and which result in attenuation of harmonics as discussed above with reference to FIG. 9.

As a result, the states of the power switches are controlled such that a substantially fixed DC voltage which is substantially equal to the reference voltage is provided across bypass capacitor 270, and such that the current through DC link inductor 230 has low harmonic distortion.

FIG. 10 illustrates a DC offset removal circuit 400 according to an embodiment of the invention. The DC offset removal circuit 400 is configured to generate and output signal which has substantially only the AC components of the input signal. The DC offset removal circuit 400 can be used, for example, in the rectifier control circuit 300 of FIG. 3 to remove the DC component of the DC link current signal Ib. Other circuits may alternatively be used for the DC offset removal circuit 360 of FIG. 3.

The DC offset removal circuit 400 includes a forward difference filter 410 and a summer 420. The input signal Ib is provided to a positive input of summer 420. In addition the input signal Ib is provided to the forward difference filter 410. The forward difference filter 410 generates an output voltage Ibdc, which is provided to a negative input of summer 420. The summer 420 combines the Ib and Ibdc signals and generates an output Ibh. Ibh contains the AC components of the input signal Ib.

FIG. 11 illustrates a harmonic regulator circuit 500 according to an embodiment of the invention. The harmonic regulator circuit 500 is configured to The harmonic regulator circuit 500 can be used, for example, in the rectifier control circuit 300 of FIG. 3. Other circuits may alternatively be used for the rectifier control circuit 300 of FIG. 3.

Harmonic regulator circuit 500 receives the AC sense signal representing the unwanted harmonic content in the DC link current, and a frequency signal from the PLL 370. Harmonic regulator circuit 500 is configured to extract the amplitudes of two quadrature DC link current harmonics of the input fundamental frequency, and to generate two harmonic compensation signals with two PI regulators, which are summed. The feedback reduces the harmonic component of the AC sense signal.

FIGS. 12-15 illustrate the impact of the harmonic regulation on the harmonic content of the DC link current and on the harmonic content of the input current, according to some embodiments.

Figure 12:
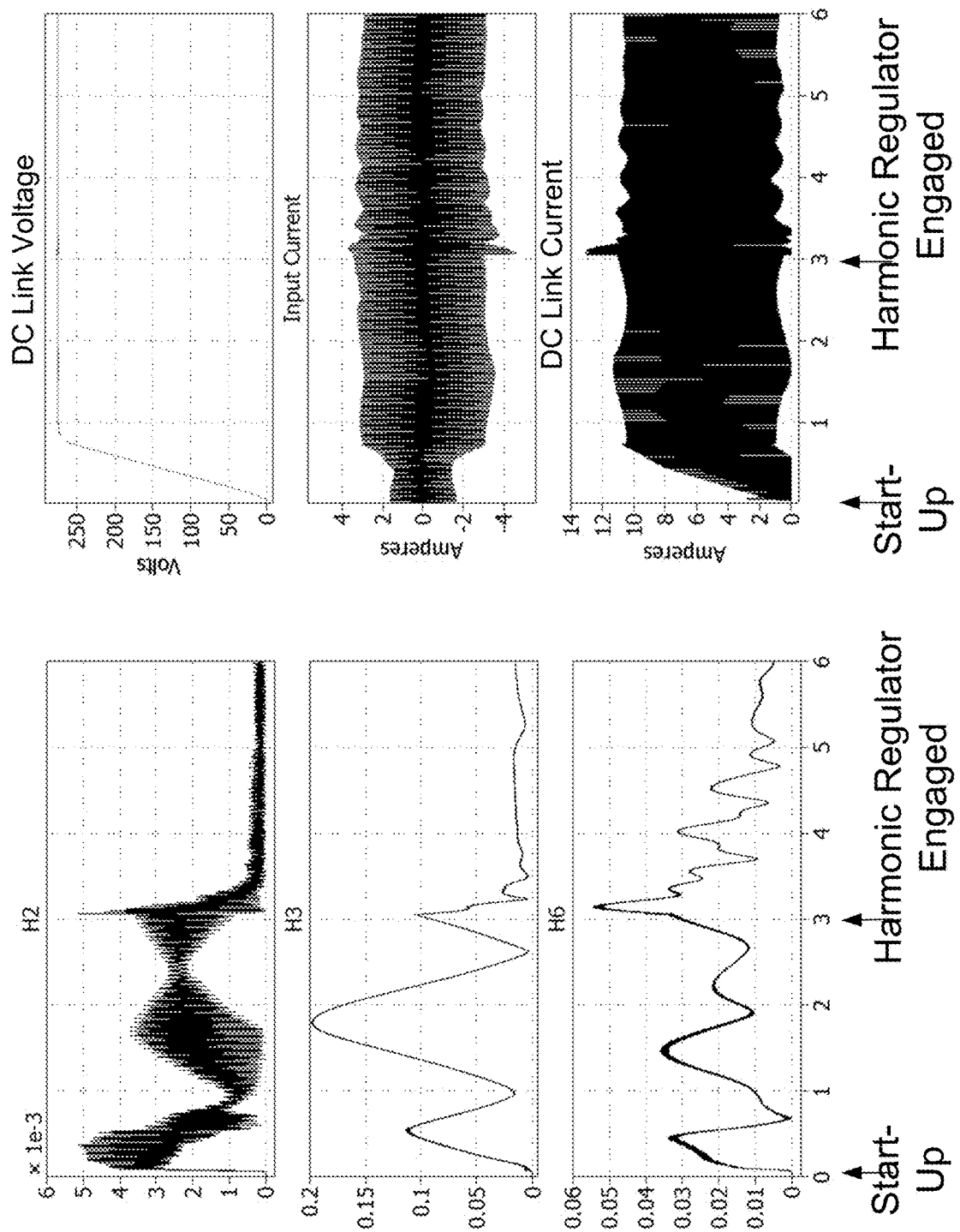
FIG. 12 illustrates the current, voltage, and harmonic performance with and without harmonic regulation.

FIG. 12 illustrates the amplitudes of the second, third, and sixth harmonics components in the DC link current before and after harmonic regulation is turned on. In this embodiment, when the current source rectifier starts up, the harmonic regulation is not active. Consequently, the amplitudes of the second, third, and sixth harmonics in the DC link current are significant. After the harmonic regulation is engaged and the system has settled, the amplitudes of the second, third, and sixth harmonics are attenuated. As shown, the harmonic content of the DC link current is better regulated and is significantly attenuated after the harmonic regulator for is engaged.

As understood by those of skill in the art, the reduction in harmonic content of the DC link current reduces the harmonic content of the input current. Specifically, reduction of the second harmonic in the DC link current results in a reduction of the third harmonic of the input current. In addition, reduction of the third harmonic in the DC link current results in a reduction of the second and fourth harmonics in the input current. Furthermore, reduction of the sixth harmonic in the DC link current results in a reduction of the fifth and seventh harmonics in the input current.

FIG. 12 also illustrates the values of the DC link voltage, the input current, and the DC link current before and after the harmonic regulation is turned on, according to one embodiment.

Figure 13:
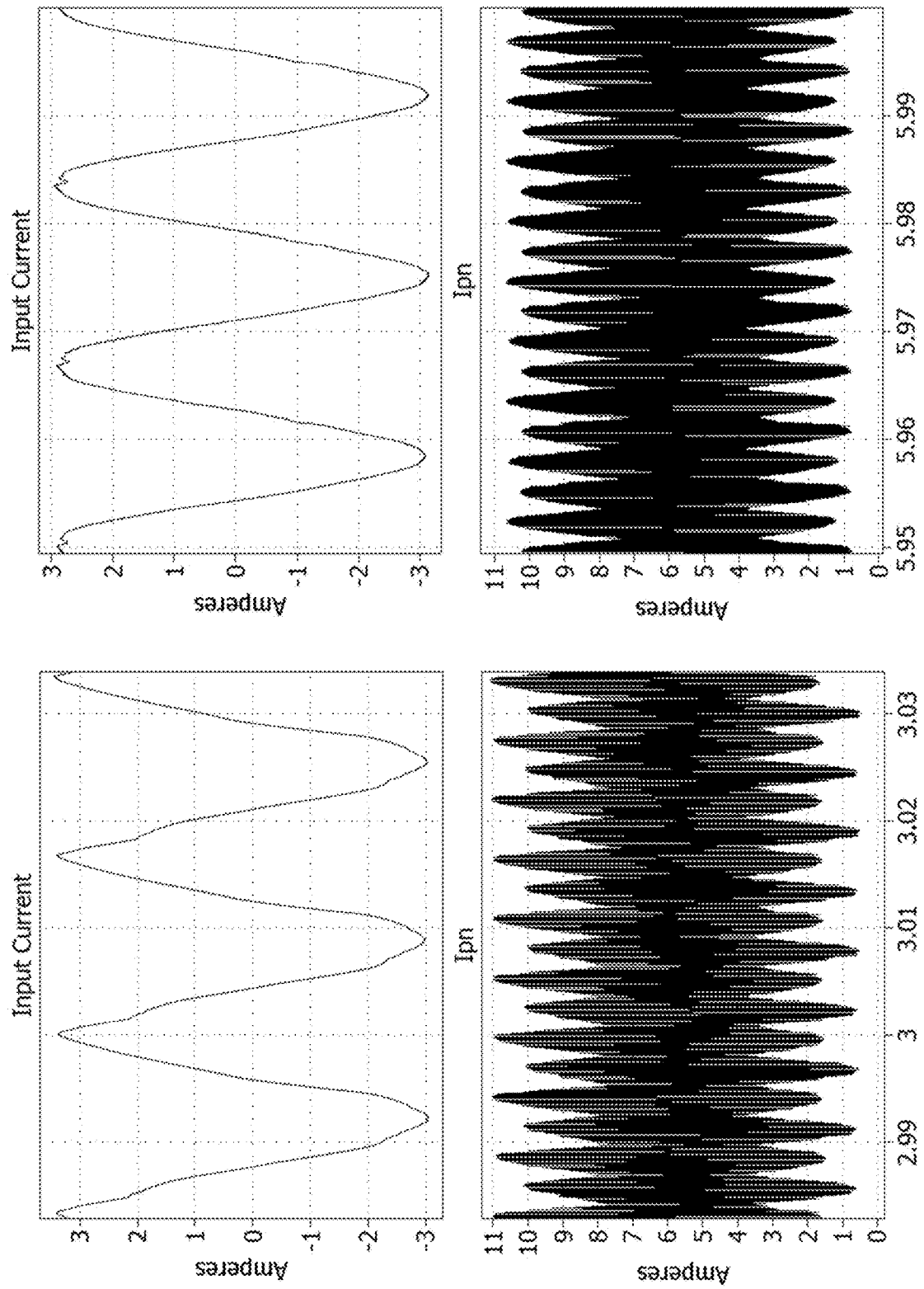
FIG. 13 illustrates input current and DC link current with and without harmonic regulation. is graph showing harmonic content of input current without harmonic regulation of the DC Link current according to an embodiment of the invention.

FIG. 13 illustrates the input current and the DC link current (Ipn) without harmonic regulation on the left and with harmonic regulation on the right, according to one embodiment. As shown on the left, the DC link current has significant harmonic content. The input current is visibly distorted from sinusoidal. In addition, the DC link current has amplitude peaks which are significantly different from one another. As shown on the right, the input current is clearly more sinusoidal. In addition, the peaks of the DC link current do not vary as much as the peaks of the DC link current shown on the left.

Figure 14:
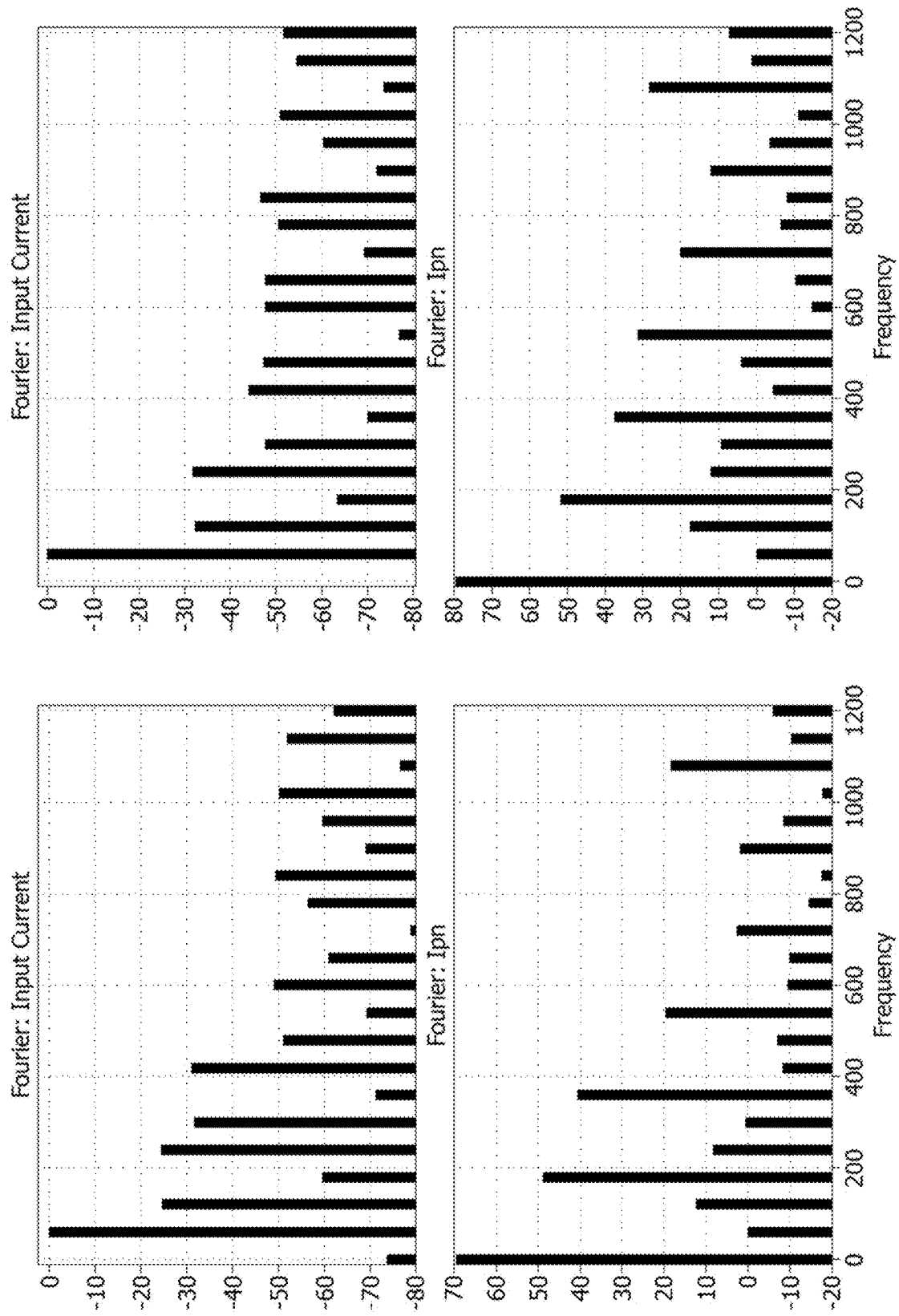
FIG. 14 illustrates harmonic components of input current and DC link current with and without harmonic regulation.

FIG. 14 illustrates harmonic components of the input current and the DC link current (Ipn) without harmonic regulation on the left and with harmonic regulation on the right, according to one embodiment.

As shown, the harmonic content of the input current has been significantly reduced by the harmonic regulation. In this example, the $2^{nd}$ harmonic has been reduced from −25 dB to −37 dB, the $3^{rd}$ harmonic has been reduced from −60 dB to −63 dB, the $4^{th}$ harmonic has been reduced from −25 dB to −31 dB, the $5^{th}$ harmonic has been reduced from −32 dB to −48 dB, and the $7^{th}$ harmonic has been reduced from −31 dB to −48 dB.

Throughout the foregoing description, for the purposes of explanation, numerous specific features were set forth in order to provide an understanding of the invention. It will be apparent, however, to persons skilled in the art that the discussed and other embodiments may be practiced without some of presented features. Likewise, it will be apparent to persons skilled in the art that the discussed and other embodiments may be practiced with other features not discussed.

What is claimed is:

1. A system, comprising:
   a rectifier circuit comprising a plurality of switches configured to receive an alternating current (AC) input signal from an AC source and to receive a plurality of control signals, wherein the control signals cause the switches to generate a rectified output signal based on the input signal and the control signals, and wherein; and
   a rectifier controller configured to generate one or more harmonic frequency signals based on the AC input signal, wherein each of the harmonic frequency signals has a frequency corresponding with a harmonic frequency of the AC input signal, and to generate the control signals based in part on the harmonic frequency signals, wherein, at least partly because of the harmonic frequency signals, the control signals additionally cause the switches to attenuate one or more harmonic frequencies of the AC input signal in the rectified output signal.

2. The system of claim 1, wherein the AC source is a three-phase AC voltage source.

3. The system of claim 1, wherein the plurality of switches are metal-oxide field effect transistors (MOSFETs).

4. The system of claim 1, wherein the rectifier controller further comprises:
   a DC offset circuit configured to remove a DC component from a sensing signal to generate an AC sense signal, wherein the sensing signal is indicative of the rectified output signal,
   one or more harmonic regulator circuits, each configured to receive the AC sense signal and a particular harmonic frequency signal, to generate a particular harmonic compensation signal based on the particular harmonic frequency signal and the AC sense signal, and to generate the control signals based at least in part on the particular harmonic compensation signal.

5. The system of claim 4, wherein the one or more harmonic regulator circuits comprises:
   a second harmonic regulator circuit configured to receive the AC sense signal and a second harmonic frequency signal, and to generate a second harmonic compensation signal based on the second harmonic frequency signal and the AC sense signal;
   a third harmonic regulator circuit configured to receive the AC sense signal and a third harmonic frequency signal, and to generate a third harmonic compensation signal based on the third harmonic frequency signal and the AC sense signal; and
   a sixth harmonic regulator circuit configured to receive the AC sense signal and a sixth harmonic frequency signal, and to generate a sixth harmonic compensation signal based on the sixth harmonic frequency signal and the AC sense signal.

6. The system of claim 1, wherein the rectifier controller is further configured to generate a controlled output voltage, and to receive a reference voltage, and wherein the rectifier controller is further configured to generate the control signals based at least in part on the reference voltage, wherein the control signals cause the rectifier controller to generate the rectified output signal such that the controlled output voltage is substantially equal to the reference voltage.

7. The system of claim 6, wherein the rectifier controller comprises:
a voltage regulator circuit configured to generate a difference signal based on a difference between the reference voltage and the controlled output voltage,
wherein the rectifier controller is further configured to generate the control signals based on the difference signal.

8. The system of claim 7, wherein the rectifier controller further comprises:
a DC offset circuit configured to remove a DC component from a sensing signal to generate an AC sense signal, wherein the sensing signal is indicative of the rectified output signal,
one or more harmonic regulator circuits, each configured to receive the AC sense signal and a particular harmonic frequency signal, to generate a particular harmonic compensation signal based on the particular harmonic frequency signal and the AC sense signal, and to generate the control signals based at least in part on the particular harmonic compensation signal.

9. The system of claim 6, further comprising an inverter configured to receive the controlled output voltage and to generate an AC voltage output based on the controlled output voltage.

10. The system of claim 9, wherein the inverter is a current source inverter.

11. The system of claim 9, wherein the inverter is a voltage source inverter.

12. A variable speed drive, comprising:
a rectifier circuit comprising a plurality of switches configured to receive an alternating current (AC) input signal from an AC source and to receive a plurality of control signals, wherein the control signals cause the switches to generate a rectified output signal based on the input signal and the control signals, and wherein; and
a rectifier controller configured to generate one or more harmonic frequency signals based on the AC input signal, wherein each of the harmonic frequency signals has a frequency corresponding with a harmonic frequency of the AC input signal, and to generate the control signals based in part on the harmonic frequency signals, wherein, at least partly because of the harmonic frequency signals, the control signals additionally cause the switches to attenuate one or more harmonic frequencies of the AC input signal in the rectified output signal; and
an inverter configured to receive the rectified output signal and to generate an AC voltage output based on the rectified output signal.

13. The variable speed drive of claim 12, wherein the AC source is a three-phase AC voltage source.

14. The variable speed drive of claim 12, wherein the plurality of switches are metal-oxide field effect transistors (MOSFETs).

15. The variable speed drive of claim 12, further comprising:
a DC offset circuit configured to remove a DC component from a sensing signal to generate an AC sense signal, wherein the sensing signal is indicative of the rectified output signal,
one or more harmonic regulator circuits, each configured to receive the AC sense signal and a particular harmonic frequency signal, to generate a particular harmonic compensation signal based on the particular harmonic frequency signal and the AC sense signal, and to generate the control signals based at least in part on the particular harmonic compensation signal.

16. The variable speed drive of claim 15, wherein the one or more harmonic regulator circuits comprises:
a second harmonic regulator circuit configured to receive the AC sense signal and a second harmonic frequency signal, and to generate a second harmonic compensation signal based on the second harmonic frequency signal and the AC sense signal;
a third harmonic regulator circuit configured to receive the AC sense signal and a third harmonic frequency signal, and to generate a third harmonic compensation signal based on the third harmonic frequency signal and the AC sense signal; and
a sixth harmonic regulator circuit configured to receive the AC sense signal and a sixth harmonic frequency signal, and to generate a sixth harmonic compensation signal based on the sixth harmonic frequency signal and the AC sense signal.

17. The variable speed drive of claim 12, wherein the rectifier controller is further configured to generate a controlled output voltage, and to receive a reference voltage, and wherein the rectifier controller is further configured to generate the control signals based at least in part on the reference voltage, wherein the control signals cause the rectifier controller to generate the rectified output signal such that the controlled output voltage is substantially equal to the reference voltage.

18. The variable speed drive of claim 17, wherein the rectifier controller comprises:
a voltage regulator circuit configured to generate a difference signal based on a difference between the reference voltage and the controlled output voltage; and
a power switch state selection circuit configured to generate the control signals based on the difference signal.

19. The variable speed drive of claim 18, wherein the rectifier controller further comprises:
a DC offset circuit configured to remove a DC component from a sensing signal to generate an AC sense signal, wherein the sensing signal is indicative of the rectified output signal,
one or more harmonic regulator circuits, each configured to receive the AC sense signal and a particular harmonic frequency signal, to generate a particular harmonic compensation signal based on the particular harmonic frequency signal and the AC sense signal, and to generate the control signals based at least in part on the particular harmonic compensation signal.

20. The variable speed drive of claim 19, wherein the inverter is a current source inverter.

21. The variable speed drive of claim 19, wherein the inverter is a voltage source inverter.

* * * * *